… …

United States Patent [19]

Krause

[11] 4,417,481

[45] Nov. 29, 1983

[54] APPARATUS FOR MEASURING THE SPEED OF FLOW OF A FLOWABLE MEDIUM BY DETERMINING THE TRANSIT TIME OF SOUND WAVES THEREIN

[75] Inventor: Gerhard Krause, Rosenheim, Fed. Rep. of Germany

[73] Assignee: Erwin Sick GmbH Optik-Elektronik, Fed. Rep. of Germany

[21] Appl. No.: 259,401

[22] Filed: May 1, 1981

Related U.S. Application Data

[63] Continuation-in-part of Ser. No. 200,166, Oct. 24, 1980, Pat. No. 4,389,899.

[30] Foreign Application Priority Data

May 2, 1980 [DE] Fed. Rep. of Germany ....... 3016968

[51] Int. Cl.³ ............................................... G01F 1/66
[52] U.S. Cl. .................................................. 73/861.28
[58] Field of Search ........... 73/861.27, 861.28, 861.29, 73/861.31, 597

[56] References Cited

U.S. PATENT DOCUMENTS

| | | | |
|---|---|---|---|
| 3,818,757 | 6/1974 | Brown | 73/861.28 |
| 3,918,304 | 11/1975 | Abruzzo et al. | 73/861.29 |
| 4,028,938 | 6/1977 | Eck | 73/861.31 |
| 4,069,713 | 1/1978 | Gassmann | 73/861.28 |
| 4,183,244 | 1/1980 | Kohno et al. | 73/861.28 |

Primary Examiner—Charles A. Ruehl
Attorney, Agent, or Firm—Townsend and Townsend

[57] ABSTRACT

Apparatus for measuring the speed of flow of a flowable medium by determining the transit time of sound waves therein wherein first and second sound transmitter/receivers in the form of electroacoustic converters are spaced apart in the medium with an imaginary line joining said first and second transmitter/receivers having a component in the direction of the flow to be measured and wherein sound pulses of predetermined length are alternately transmitted in a first direction from said first transmitter/receiver to said second transmitter/receiver and in a second direction opposite to said first direction from said second transmitter/receiver to said first transmitter/receiver said sound pulses being converted into electrical measurement pulses on arrival at said transmitter/receivers there being processing circuitry for processing electrical measurement pulses to determine the speed of flow from the transit times of the sound pulses in said first and second directions, said processing circuitry including means for precluding from the determination electrical measurement pulses which do not conform to an expected pattern as a result of electrical or acoustic disturbances.

16 Claims, 6 Drawing Figures

FIG. 5

APPARATUS FOR MEASURING THE SPEED OF FLOW OF A FLOWABLE MEDIUM BY DETERMINING THE TRANSIT TIME OF SOUND WAVES THEREIN

The present application relates to apparatus for measuring the speed of flow of a flowable medium by determining the transit time of sound waves therein and is a continuation-in-part of my U.S. patent application Ser. No. 200,166, filed Oct. 24, 1980 now U.S. Pat. No. 4,389,899.

In known apparatus of this kind first and second transmitter-receivers in the form of electroacoustic converters are arranged spaced apart in the direction of flow. The arrangement is such that an imaginary line joining the first and second transmitter-receivers has at least a component in the direction of the flow to be measured. Sound pulses are sent alternately in a first direction from the first transmitter-receiver to the second transmitter-receiver and in a second direction opposite to the first direction from the second transmitter-receiver to the first transmitter-receiver. A processing circuit is able to determine the speed of flow from the transit times of the sound pulses in the first and second directions.

It will be appreciated that the transit time of the sound pulses depends on the speed of propagation of sound through the flowing medium. One device suitable for measuring the speed of sound in a flowable medium such as gas or water is disclosed in DE-OS No. 20 24 882. This known device does not however enable the transit time error occurring in the apparatus itself to be compensated. Moreover, the known device also has the disadvantage that the time intervals required for measurements in the two directions has to be relatively large because a number of pulses must be measured in the one direction before the measurement can be effected in the other direction and this second measurement also requires a number of sound pulses. The measurement error introduced by measuring devices of this kind which operate by means of sound waves represents a significant problem because the speed of flow has to be determined from a small value obtained by subtracting very large measured values.

The low change-over frequency in the known device between the two directions of measurement is a disadvantage because the flow velocity of the medium and the speed of sound can already have changed in the time between the changeover from the measurement in one direction to the measurement in the other direction, for example due to bubbles and changes in temperature. The exclusion of echoes is also difficult with the known arrangement because the repetition frequency of the sound pulses depends on the speed of sound and because no pause can be inserted between receipt and transmission. Measures also have to be taken to suppress oscillations at a harmonic of the basic frequency. In principle it is also basically possible to measure at the same time in both directions. It is then however necessary to work with different carrier frequencies in the two directions and both a transmitter and a receiver have to be provided at opposite ends of the path along which the measurement is made. Both these measures however give rise to the disadvantage that the errors along the measurement paths, in the electroacoustic converters and in the circuitry can no longer be adequately compensated.

The principal object underlying the parent application is the provision of apparatus of the initially named kind which only requires two electroacoustic converters which can be connected as required to act as transmitters or receivers, which enables a constant pulse frequency to be used, which enables individual pulses to be alternately transmitted in one of the two possible directions and which enables transit time errors in the apparatus to be corrected in simple manner.

A further object of the parent application is to allow the compensation for the transit time error in the apparatus to be automatically adjusted to take account of the instantaneously prevailing size of this error.

In order to accomplish these objects the parent application envisages an arrangement of the initially named kind in which pulse circuits are provided, which for each of said first and second directions have available:

(a) a pulse generator operating at a first specific frequency, (b) a frequency generator which preferably operates at a higher frequency, said frequency generator having a frequency control input and a setting or trigger input to which pulses of the pulse generator are applied, and (c) a phase detector having first and second inputs to which received pulse signals and the output of the frequency generator are respectively applied with the output of said phase detector being passed to a mean value forming stage which is in turn connected to the frequency control input of the frequency generator and which regulates the frequency of the frequency generator to a value corresponding to the time interval between the arrival of a pulse at the setting input and the arrival of the received pulse signal at the phase detector, and wherein the frequencies of the frequency generators are passed to the processing circuit.

As a result of this construction the transit times are directly converted into frequencies which can be generated and measured with great accuracy even with analogue techniques. As a result of the use of a controllable frequency generator with follow up control via the mean value forming stage it is possible to form the mean value of the signal with very simple analogue means without giving rise to a loss of accuracy. A further advantage of the measuring apparatus of the present invention is the fact that the transit times, and thus the frequencies representing the velocity of sound in the various directions, are continuously available. As a result the complexity of the control circuits is considerably reduced and intermediate storage of information is avoided.

In one particularly advantageous embodiment the frequency generator is formed by a series connection of a high frequency oscillator and a frequency divider. The frequency of the high frequency oscillator is controlled by the mean value forming stage.

In the simplest case the mean value forming stage can take the form of a low pass filter. A sample and hold circuit can also be used for the mean value forming stage.

The transmission time error of the apparatus can be removed in simple manner from the apparatus of the parent application by arranging a delay device in front of the setting input of the frequency generator with the delay introduced by the delay device being equal to the transit time errors in the transmission and receiving circuits including the error introduced by the associated transmitter-receivers. The delay introduced by the delay device is usefully made controllable with the transit time error being preferably measured during the operation of the apparatus and the delay introduced by the delay device being adapted to take account of the prevailing transit time error. For this purpose the delay device preferably has a control input whereby, by way of example, the delay introduced by the delay device can be controlled as a function of the measured temperature of the associated converter and/or the apparatus. A temperature dependent change in the transit time error can in this way be taken into account in a simple manner.

In one advantageous and practical embodiment a modulator is connected between each pulse generator and its associated transmitter-receiver with the pulse signals being used to modulate a higher frequency signal supplied to the modulator and a corresponding demodulator being provided at the receiver end. Furthermore, a gate circuit can be arranged in the receiving channel with the gate circuit being so controlled from the pulse generator via a further delay device that the gate circuit is only open for a time corresponding approximately to the time of arrival of the received pulse. The receiving circuit is thus only active for a period of time in which the arrival of a pulse can be expected. As a result disturbances and undesired echoes are suppressed.

The present invention is concerned with improving the performance of apparatus for determining the speed of a flowing medium and is particularly but not exclusively directed to improving the performance of the apparatus of the parent application. In prior art apparatus, and in the apparatus described in the parent application, the electrical measurement signals received from the electroacoustic converters frequently exhibit pronounced disturbances and amplitude fluctuations. This can be attributed, for example when measuring flow velocities in smoke stacks or chimneys, to the fact that a large ambient noise level exists so that acoustic noise signals are frequently present. The possibility also exists in technical installations for the measurement of flow velocity that disturbing electrical signals will also be generated through scattering or other mechanisms. The amplitude fluctuations are a consequence of the multiple path propagation of the acoustic signal together with turbulence and inhomogeneities in the flowing medium. The related disturbing influences lead to erroneous measurement results so that the reliability of the known measuring arrangements is limited by large disturbing influences which cannot be kept away from the apparatus.

The principal object underlying the present invention is to provide apparatus for measuring the speed of flow of a flowable medium, by determining the transit time of sound waves therein, which allows the effects of electrical and acoustical disturbances on the result of the measurement to be considerably reduced without the use of excessively complicated circuitry.

Further objects of the present invention will become clear from the following distance and claims.

In accordance with a first aspect of the present invention there is provided apparatus for measuring the speed of flow of a flowable medium by determining the transit time of sound waves therein wherein first and second sound transmitter/receivers in the form of electroacoustic converters are spaced apart in the medium, with an imaginary line joining said first and second transmitter/receivers having a component in the direction of the flow to be measured, and wherein sound pulses of predetermined length are alternately transmitted in a first direction from said first transmitter/receiver to said second transmitter/receiver and in a second direction opposite to said first direction from said second transmitter/receiver to said first transmitter/receiver said sound pulses being converted into electrical measurement pulses on arrival at said transmitter/receivers there being processing circuitry for processing electrical measurement pulses to determine the speed of flow from the transit times of the sound pulses in said first and second directions, said processing circuitry including means for precluding from the determination electrical measurement pulses which do not conform to an expected pattern.

As seen from a different point of view there is also provided, in accordance with the present invention, apparatus for measuring the speed of flow of a flowable medium by determining the transit time of sound waves therein wherein first and second sound transmitter/receivers in the form of electroacoustic converters are spaced apart in the medium, with an imaginary line joining said first and second transmitter/receivers having a component in the direction of the flow to be measured, and wherein sound pulses of predetermined length are alternately transmitted in a first direction from said first transmitter/receiver to said second transmitter/receiver and in a second direction opposite to said first direction from said second transmitter/receiver to said first transmitter/receiver said sound pulses being converted into electrical measurement pulses on arrival at said transmitter/receivers, there being processing circuitry for processing electrical measurement pulses to determine the speed of flow from the transit times of the sound pulses in said first and second directions, said processing circuitry operating to process only electrical measurement pulses arriving within a predetermined interval defining the expected time of arrival of a measuring pulse and having means for excluding measurement pulses, or signals derived therefrom, from further processing if at least one of the following conditions applies:

(a) more than one electrical measurement pulse arrives in said predetermined interval, (b) no measurement pulse arrives in said predetermined interval, (c) the electrical measurement pulse exceeds a predetermined length, (d) the electrical measurement pulse falls short of a predetermined length.

Both these arrangements can be used in various types of apparatus for the measurement of flow velocity and are not restricted in any way to use only with the invention of the parent application. According to a further aspect of the present invention, which is particularly suited for use in conjunction with the invention of the parent application, there is provided apparatus for measuring the speed of flow of a flowable medium by determining the transit time of sound waves therein wherein first and second sound transmitter/receivers in the form of electroacoustic converters are spaced apart in the medium with an imaginary line joining said first and second transmitter/receivers having a component in the direction of the flow to be measured and wherein sound pulses of predetermined length are alternately transmitted in a first direction from said first transmitter/receiver to said second transmitter/receiver and in a second direction opposite to said first direction from said second transmitter/receiver to said first transmitter/receiver said sound pulses being converted into electrical measurement pulses on arrival at said transmitter/receivers, there being processing circuitry for processing said electrical measurement pulses to determine the speed of flow from the transit times of the sound pulses in the two directions, said processing circuitry including first and second controllable frequency generators respectively associated one with each of said first and second transmitter/receivers for generating respective oscillating signals the periods of which are respectively related to the transit times in said first and second directions, circuit means for generating control signals for controlling said first and second frequency generators in dependence on information derived from electrical measurement pulses received within a predetermined interval defining the expected time of arrival of a measuring pulse and means for preventing control signals generated in respect of said predetermined interval being used to control said frequency generators if at least one of the following conditions applies:

(a) more than one electrical measurement pulse is received in said predetermined interval, (b) no electrical measurement pulse is received in said predetermined interval, (c) a received electrical measurement pulse exceeds a predetermined length, (d) a received electrical measurement pulse falls short of a predetermined length.

In the above arrangements the electrical measurement pulses or control signals derived therefrom are preferably temporarily stored in an intermediate store and the contents of this store are only passed on via main switch means for further processing when a received electrical measurement pulse complies with the expected pattern or when the conditions (a) to (d) are not applicable.

The thought underlying the invention can thus be seen in the fact that only good quality electrical signals are used in the processing circuitry to determine the transit times of sound waves which are subsequently used for measuring the speed of flow. In contrast the invention provides apparatus which is able to reject measurement pulses which have been affected by electrical or acoustic noise, or scattering or some other disturbing influence. In other words the apparatus is able to discriminate between good and bad electrical measurement pulses.

As, in the predetermined interval, one and only one electrical measurement pulse of a predetermined length should appear when no disturbing influences are exerted on the measuring apparatus or on the measurement path, it is possible to detect deviation from this normal condition using simple circuit means so that the affected signals are not used in determining the velocity of flow. The gap which is created by the rejection of one or more electrical measurement pulses is not critical because the apparatus can continue to function satisfactorily on the basis of information previously supplied from the intermediate store in a period when troublefree conditions prevailed. This admittedly has the consequence that changes of the flow velocity signal which occur within two or more time periods cannot be detected when these time periods are left out of the measurement because of the existence of external disturbing influences; the measuring error which arises is however extremely small because the measuring apparatus to which the invention is applicable will in any case be so constructed that fluctuations of the flow velocity will hardly occur within one time period, or even within a few time periods. In accordance with one practical embodiment of the invention there is provided apparatus for measuring flow velocity wherein each electrical measurement pulse is connected to a counter via a signal path, in particular via an auxiliary switch, which is only closed during said predetermined interval with said counter being connected via a comparator, which distinguishes the count 1 from all other counts, to a control circuit for said main switch means wherein said control circuit is activated for a short period of time to transmit a "close path signal" to said main switch means following the expiry of said predetermined interval when said comparator has detected one and only one pulse.

This embodiment makes it possible to determine whether no pulse or several pulses occur instead of one pulse as is desired.

A further refinement of this apparatus is provided by an arrangement in which a pulse length detection stage is also connected to said control circuit via said auxiliary switch with said pulse length detection stage only activating the control circuit to transmit a "close path signal" when the pulse length lies within a predetermined tolerance.

This arrangement makes it possible to reject measurement pulses the length of which differs from the norm.

The control circuit is preferably an AND gate which is connected to the output of the comparator and to a pulse former which transmits a pulse which begins shortly before the predetermined interval and which lasts sufficiently long for the content of the intermediate store means to be passed on completely via said main switch means.

In order to additionally detect a pulse length which deviates from the norm the output of the pulse length detection stage can also be connected to the AND gate. The auxiliary switch is preferably controlled by a delay device which is connected to the pulse generator used to generate the sound pulses. The period in which the auxiliary switch is closed thus provides a time window within which the presence of no pulse, several pulses, or a pulse length which deviates from the norm is detected.

It is of particular advantage if the intermediate store means has a time constant such that it operates substantially linearly for normal velocity fluctuations but has a characteristic which rises less rapidly or reduces for long time differences.

This embodiment provides a substantial advantage if the time difference between the arrival of a sound pulse and the expected time of arrival is considerably greater than the normal tolerance. This time difference is normally very small (for example 100 μs), it is produced by velocity fluctuations within a period which is so short that it cannot be followed by a mean value forming stage used to control the associated one of the controllable frequency generators, and also by noise in the amplifier circuits that will be used.

In this case, without the above defined preferred embodiment, a value would be stored in the intermediate store which was considerably increased relative to the normal condition. The above embodiment however limits this stored value to a size which corresponds to normal fluctuations so that a disturbing pulse of this kind does not result in significant fluctuation of the measurement result. It is particularly advantageous if the time constant of the intermediate store is considerably smaller than the time window so that received pulses with an unusual temporal position do not have a significantly larger effect on the control circuit for the associated frequency generator than pulses which fit into the normal pattern. In the simplest case the intermediate store means can comprise an RC network. The intermediate store should be provided with an erase input which is actuated before the earliest possible time of arrival of an electrical measurement pulse, or a control signal derived therefrom, so that the intermediate store always has a defined initial content.

The present invention can, as previously mentioned, be used to great advantage in combination with the invention of the parent application. In this case it is envisaged, in accordance with the present invention, that the intermediate store means and the switch means are inserted between the phase detector and the low pass filters or integrators associated with each of the controllable frequency generators. In this way the frequency generators of the older arrangement continue to operate at the previously selected frequency even in the event of an external disturbance so that the transit time signals which are finally formed remain unchanged in the periods which are deleteriously affected by disturbing influences. The operation of the frequency generators can be compared with the effect of a rotating flywheel.

When using the invention for apparatus in accordance with the parent application the auxiliary switch is usefully connected to the measurement input to the or each phase detector.

A particularly advantageous modification of the invention is achieved when only a single phase detector, and, if desired, only a single intermediate store is provided for both of said first and second directions with the electrical measurement pulses for these two directions being applied to the phase detector. The output of the intermediate store which follows the phase detector is then connected in parallel to two main switches which are arranged at the inputs to the low pass filters or integrators. As sound pulses are passed at different times in the first and second directions along the measurement path it is possible to use only a single phase detector and intermediate store with the electrical measurement pulses from the first and second transmitter/receivers falling one after the other on the phase detector. For the same reason the electronic components which are required, in accordance with the invention, to exclude disturbing influences also only needed to be provided once because they can be used at different times for the processing of signals associated with the measurement pulses from the first and second directions. This enables a considerable saving to be made in the number of electronic components that are required.

The present invention will now be explained in further detail by way of example only and with reference to the accompanying drawings which show:

FIG. 1 a schematic block circuit diagram of an apparatus in accordance with the parent application, FIG. 2 a pulse diagram for illustrating the manner of operation of the apparatus of FIG. 1, FIG. 3 a block circuit diagram of the detector circuit 43 of FIG. 1, FIG. 4 a circuit block diagram of a measuring apparatus in accordance with the present invention, FIG. 5 a circuit diagram of the measuring apparatus of FIG. 1 showing further detail and FIG. 6 a preferred characteristic for a phase detector or the intermediate store of the measurement apparatus of FIGS. 4 and 5.

Figures 1, 2:
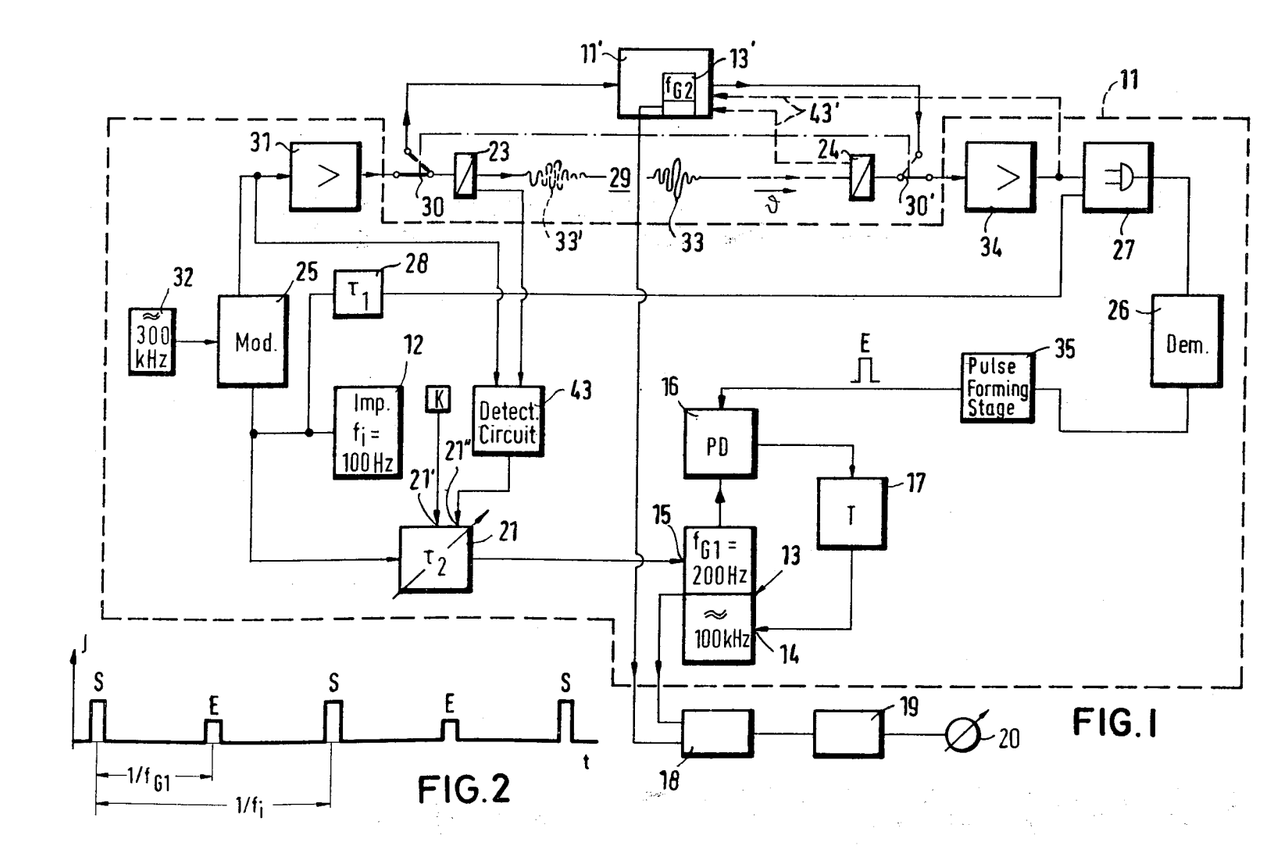

The measuring apparatus of the parent application consists of two, identically constructed, pulse circuits 11, 11' of which, in view of the identical construction, only the first pulse circuit 11 is shown in detail in FIG. 1. The second pulse circuit 11' is indicated simply as a block.

First and second transmitter-receivers 23, 24 which are each in the form of electroacoustic converters are spaced apart in the direction of flow through the measuring section 29. Although the first and second transmitter-receivers 23, 24 are preferably aligned with one another in the direction of flow this is not absolutely essential. It is only necessary for the imaginary line joining the first and second transmitter-receivers to have at least a component in the direction of the flow to be measured.

As will be later explained in more detail sound pulses are sent alternately in a first direction from the first transmitter-receiver 23 to the second transmitter-receiver 24 and in a second direction from the second transmitter-receiver 24 to the first transmitter-receiver 23. For this purpose change-over switches 30, 30' which are coupled together connect either the electroacoustic converter 23 to the transmitter side of the first pulse circuit 11 and the electroacoustic converter 24 to the receiver side of the first pulse circuit 11 or, alternatively, the electroacoustic converter 24 to the transmitter side of the second pulse circuit 11' and the electroacoustic converter 23 to the receiver side of the second pulse circuit 11'.

The change-over switches 30, 30', which can readily take the form of electronic switches, are continuously switched to and fro between their two positions at a frequency corresponding approximately to the pulse frequency. The pulse frequency is dependent on the length of the measuring path 29 and on the velocity of sound in the medium. By way of example the pulse frequency can conveniently equal 100 Hz.

FIG. 1 illustrates the condition in which the converter 23 is connected to the transmission side of the first pulse circuit 11 and the converter 24 is connected to the receiver side of this pulse circuit. The converters 23, 24 are located at the end of a measuring section 29 along which a medium flows with the speed v.

The converter 23 is connected via the change-over switch 30 and an amplifier 31 to a modulator 25. In the modulator 25 a high frequency signal with a frequency of approximately 300 kHz coming from a high frequency oscillator 32 is modulated by a rectangular pulse coming from a pulse generator 12. The rectangular pulses coming from the pulse generator 12 have, by way of example, a repetition frequency of 100 Hz. The pulses are relatively narrow in comparison to the time interval between the pulses as can be seen from FIG. 2 where the transmitted pulse (S) is shown as a function of time. As a result of the described arrangement the electroacoustic converter 23 transmits pulse groups 33 at time intervals of $1/f_i$ along the measuring path 29 to the electroacoustic converter 24. This converter serves, in the illustrated position of the switches 30, 30', as a receiver. The pulse signals received by the converter 24 are passed to a demodulator 26 via an amplifier 34 and a gate circuit 27. The demodulator 26 together with a subsequent pulse shaper 35 re-creates the original pulse shape so that a received pulse signal E is present at the outlet of the pulse shaper 35. The shape of the received pulse signal E corresponds to the shape of the transmitted pulse signal S. This is also indicated in FIG. 2. The important feature of the pulse E is however not the width of the pulse but rather the flank of the pulse.

The pulses of the pulse generator 12 are passed at the transmitter side via a delay device 21, the function of which will be later described, to the second or trigger input 15 of a frequency generator 13 the frequency of which is controllable. In the described embodiment the frequency generator 13 consists of a high frequency oscillator of controllable frequency having, by way of example, a center frequency of 115 kHz, and a frequency divider with a ratio of 1:500 connected to the high frequency oscillator. The frequency generator thus operates with a frequency of 230 Hz. The frequency of the frequency generator is controlled via a frequency control input 14 at the high frequency oscillator part of the generator 13. The output of the frequency generator 13 and the received pulse signal E are respectively passed to first and second inputs of a phase detector 16. The output of this phase detector controls the control input 14 of the frequency generator via a mean value forming stage 17 which is constructed as a low pass filter.

The layout of the frequency generator 13, the phase detector 16 and the mean value forming stage 17 is such that on the arrival of a pulse at the setting input 15 the phase of the generator 13 is set to a specified condition, for example the null point. After a time interval $1/f_{G1}/(f_{G1})$ is defined in FIG. 2) a pulse signal is present at the output of the frequency generator 13, and thus at the second input of the phase detector 15, and the phase of this pulse is compared with the phase of the received pulse signal E supplied to the first input of the pulse detector 15. The output signal of the phase detector 16 together with the mean value forming stage 17 now controls the frequency of the generator 13 so that the frequency of the generator 13 is increased if the pulse from the frequency generator arrives later than the received pulse signal at the phase detector 16 and vice versa. In this manner the frequency generator 13 is regulated to a frequency $f_{G1}$ the reciprocal of which is equal to the transit time of the pulse along the measuring section 29. As the high frequency oscillator of the frequency generator 13 is continuously oscillating a frequency signal which corresponds exactly to the transit time is continuously available at the frequency generator.

In corresponding manner a frequency signal $f_{G2}$ is generated at the output of the frequency generator 13' of the second pulse circuit 11'. The reciprocal of this frequency signal $f_{G2}$ is the same as the transit time of the pulse 33' from the second converter 24 to the first converter 23 as is illustrated in broken lines in FIG. 1. The common change-over of the change-over switches 30, 30' from the first pulse circuit 11 to the second pulse circuit 11' takes place in a sequence such that one pulse is allowed to pass from the first converter 23 to the second converter 24, or from the second converter 24 to the first converter 23, with the change-over taking place after the passage of this pulse. With a repetition frequency of 100 Hz the change-over between the two directions thus takes place every 1/100 of a second and this is completely adequate to ensure the same flow conditions for the two directions of sound propagation.

The outputs of the frequency generators 13, 13' are subsequently passed to a processing circuit which evaluates the speed of flow from the transit times of the sound pulses in the first and second directions. The processing circuit firstly includes a difference forming stage 18 in which the difference of the frequencies on the oscillators 13, 13' is measured. The difference signal is proportional to the speed of flow. A subsequent switching stage 19 multiplies the difference signal by a constant in dependence on the division ratio in the generator 13 and the length of the measurement path. If required an analogue/digital conversion can also be carried out in the switching stage 19. A display device 20 is connected to the switching stage 19. The two frequency signals are thus converted in the two stages 18, 19 directly into a signal representative of the speed of flow v of the flowing medium and this signal is then displayed at the display devvice 20. The pulses of the pulse generator 12 delivered to the setting input 15 can be delayed by a time $\tau_2$ by means of the preferably regulatable delay device 21. The time $\tau_2$ can be regulated to a value corresponding to the transit time errors of the apparatus. The delay device 21 can have a control input 21' to which a signal provided by a temperature error detector K is applied. The delay time can thus be automatically regulated in dependence on the temperature of the apparatus. In this manner temperature dependent transit time errors within the apparatus including the converters 23, 24 are also taken into account.

The delay device 21 can be omitted if, during setting, the counter is not set to zero but rather adjusted to a value which deviates sufficiently from zero that the value zero is achieved only after the desired delay time. It is useful to provide a facility for controlling the value to which the counter is set so as to take account of changes in temperature of other environmental influences.

The pulse generator 12 is in addition connected to the second input of a gate circuit 27 via a further delay device 28 which introduces a delay $\tau_1$. The delay $\tau_1$ is so selected that the gate circuit is only open for a time interval in which the arrival of a received pulse E can be expected. The further delay device 28 thus determines not only the time of opening of the gate circuit 27 but also the duration of the interval for which the gate circuit 27 is open.

Figure 3:
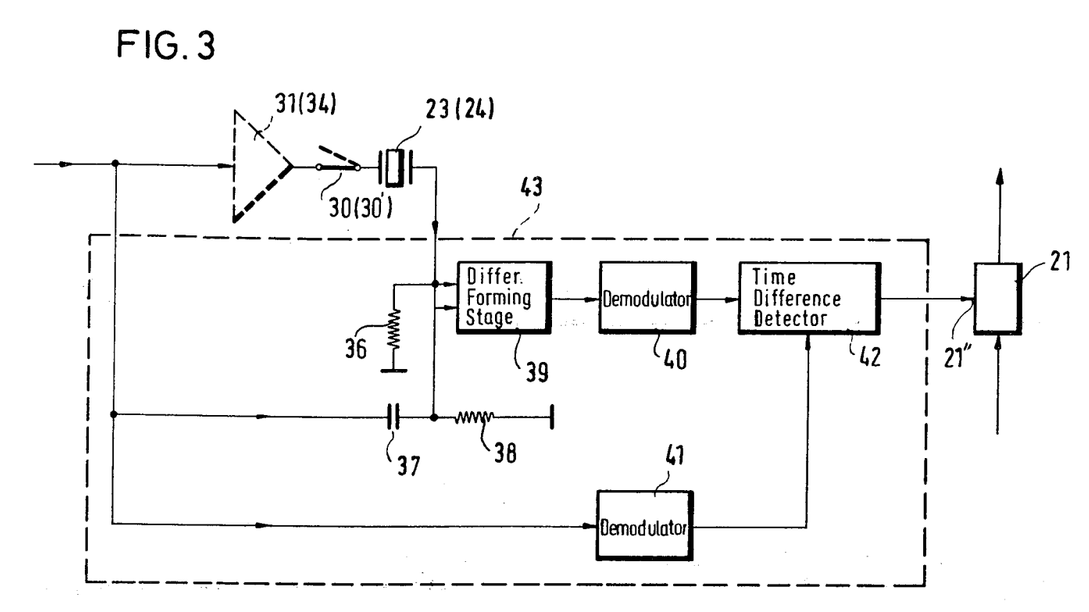

As seen in FIGS. 1 and 3 the delay device 21 also has a second control input 21" which is applied to a detector circuit 43 which receives the input signal of the amplifier 31 and also the output signal of the first converter 23. The detector circuit 43 serves to detect the transit time errors or the delay times or phase displacements of the mdoulated carrier signal brought about by the amplifier 31 and first converter 23 and to regulate the delay device 21 via the input 21" to introduce a corresponding delay. A similar circuit can be provided for the amplifier 34 and the second converter 24 in the second pulse circuit 11' as indicated by the broken lines 43'.

For accurate measurements it is namely necessary to take account of the fact that the total transit time is composed of the signal transit time through the medium to be investigated, the delay time and also the transit time in the apparatus. The delay times and transit times brought about by the apparatus have to be compensated. The largest part of the delay time of the apparatus is brought about by the electronic converters 23, 24 and, eventually, also by the amplifiers 31 and 34 connected in front of the electronic converters 23, 24. The characteristics of the converters 23, 24, and, if present, also the amplifiers 31, 34 are temperature dependent. The delay times also change in dependence on the age of the circuit elements. The changes of the delay times introduced by the converters 23, 24 and, if present, also the amplifiers 31, 34 can be detected by the detector circuit 43 shown in detail in FIG. 3.

As seen in FIG. 3 the carrier frequency pulse which is in any case present is passed to the electroacoustic converters 23 and 24 respectively. In general the amplifiers 31 and 34 which are only illustrated in broken lines in FIG. 3 are connected in front of the first and second electroacoustic converters 23, 24 respectively. The current through the converter 23, or 24 is measured as a voltage drop at a resistor 36 which is connected between earth and the one electrode of the converter 23, (or 24).

In order to eliminate the capacity of the converter 23, (or the converter 24) which delivers no information about the delay time of the acoustic signal a series circuit of a capacitor 37 and a further resistor 38 is connected in parallel to the arrangement of the converter 23, (or 24), and the resistor 36 and, if present, the associated amplifier 31 (or 34). The connection point between, on the one hand, the converters 23, 24 and the resistor 36 and, on the other hand, the capacitor 37 and the resistor 38 are applied to the two inputs of a difference forming stage 39. The capacity of the capacitor 37 and the resistance 36, 38, which are significantly smaller than the impedance of the converters at the carrier frequency, are so selected that the capacitive current of the converter 23 (or 24) is compensated. This capacitive current thus provides no signal at the output of the difference forming stage 39.

The mechanical oscillation of the converters 23 and 24, which are preferably piezoelectric converters, however brings about an imbalance of the bridge circuit 33, 36, 37, 38 which makes itself noticable as a finite output signal of the difference forming stage 39. This output signal is demodulated in a demodulator 40. A carrier pulse which is changed or distorted by the mechanical characteristics of the converter is thus present at the output of the demodulator 40. This carrier pulse is time displaced in accordance with the electromechanical transmission factor of the converter 23, or, as appropriate, the converter 24. The output of the demodulator 40 is applied to a time difference detector 42, the other input of which is applied via a further demodulator 41 to the input terminal of the capacitor 37. The demodulator 41 thus delivers a carrier pulse which has not been changed either by the amplifier 31, (or 34) or by the converter 23, (or 24).

A control signal is thus present at the output from the detector with the control signal corresponding to the delay brought about in the carrier pulse by the amplifier 31, (or 34) and by the converter 23, (or 24).

A corresponding delay is produced by applying the signal to the control input 21'' in the delay device 21 so that the influence of the amplifier 31 (or 34), and the influence of the converter 23, (or 24), on the accuracy of measurement are eliminated.

In this manner the delay time of the two converters 23, 24 can be measured and added. If necessary one can also limit the measurement to the measurement of the delay time of one converter. The control adjustment for the delay device 21 is then doubled.

The measurement of the phase difference between the carrier pulse and the mechanical oscillation of each of the converters 23 or 24 described with reference to FIG. 3 can be carried out separately with advantage. In this case the circuit elements shown in FIG. 3 would also have to be correspondingly provided in duplicate.

When the transit time error is detected with the aid of the detector 43 the detector K can be omitted.

It will be understood that the pulse shaper 35 can be of very simple construction and can simply take the form of a threshold circuit which generates the rectangular pulses E when the signal received from the demodulator lies above a specific threshold. As previously mentioned the widths of the pulses E are unimportant because the phase detectors 16 only need to make use of the leading edges of the pulses in effecting the phase comparison with the signals received from the frequency generators 13, 13'. It will also be understood that the delay device 28 can also be of very simple construction; it can for example take the form of a counter which starts to count as a pulse issues from the pulse generator 12 and opens the gate 27 after a predetermined count has been reached. The counter can also be arranged to close the gate 27 after a further predetermined count thus defining the time during which the gate 27 is open. The use of a 300 kHz signal modulated (or gated) by the pulse generator 12 improves the transmission characteristics of the sound pulse transmitted through the measuring section thus improving the quality of the signal received at the far end of the measuring section.

The transmitter-receivers 23, 24 normally each take the form of a single piezoelectric, electroacoustic converter (or transducer) which can operate either as a transmitter or receiver as required.

The present invention will now be described in detail by way of example only and with reference to the further drawings of FIGS. 4 to 6.

Figure 4:
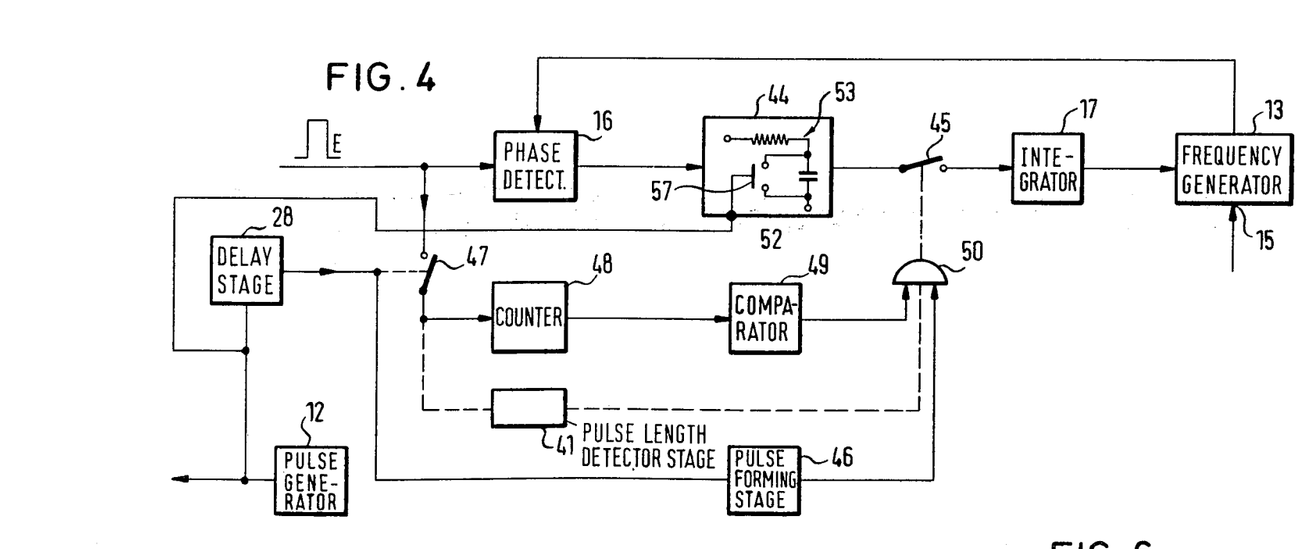
Figure 5:
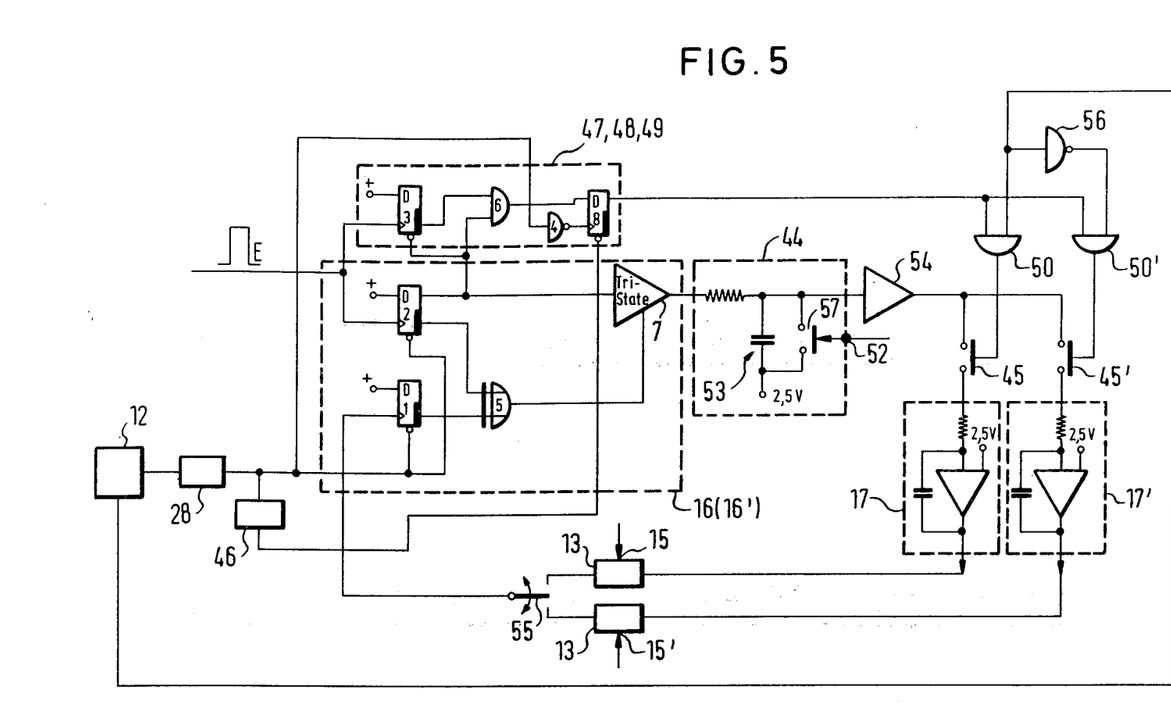
Figure 6:
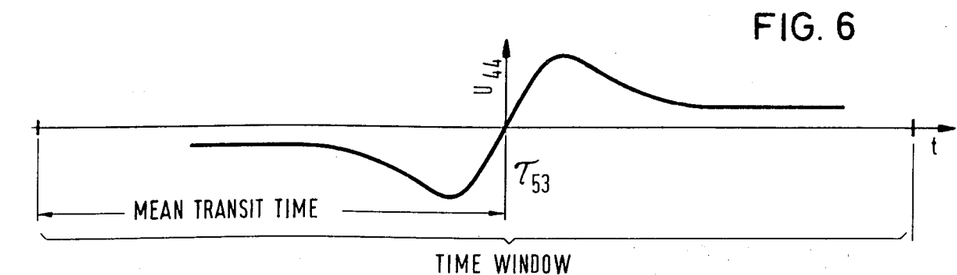

In FIGS. 4 to 6 constructional elements which have counterparts in the preceding FIGS. 1 to 3 are designated by the same reference numerals for the sake of consistency. The circuits shown in FIGS. 4 and 5 show sections from the circuits of FIGS. 1 to 3 as described above from which details unnecessary to an understanding of the present invention have been omitted so as to simplify the representation.

Turning now to FIG. 4 there can be seen an arrangement in which, in accordance with the arrangement of FIGS. 1 to 3, a frequency generator 13 which is equipped with a setting input 15 and the frequency of which can be controlled by a low pass filter or integrator 17 is connected to the one input of a phase detector 16. The signal E from the measuring path 29, i.e. the electrical measurement pulse is passed to the other input of the phase detector.

In accordance with the invention an intermediate store 44 and a switch 45 are inserted between the phase detector 16 and the integrator 17. The intermediate store 44 contains an RC network 53 and has an erase input 52 which, by way of example, is controlled by the pulse generator 12 and is actuated at the start of a measurement period in order to set the intermediate store 44 to a predetermined basic value.

The signal E from the measuring path is also applied via an auxiliary switch 47, a counter 48 and a comparator 49 to an AND gate 50 the output of which controls the main switch 45. The second input of the AND gate 50 is connected via a pulse forming stage 46 with the output of the delay device 28 which also controls the auxiliary switch 47. At the output of the delay device 28 there appears, in accordance with the arrangement disclosed in the abovementioned parent application, a window signal which closes the auxiliary switch 47 within a predetermined interval within which sound measurement pulses E are expected from the measurement path. The pulse forming stage 46 is constructed in accordance with the invention as a monostable flipflop which is set by the rear flank of the window pulse from the delay stage 28 and then transmits a pulse which is sufficiently long that, on the application of a 1 to the other input of the AND gate 50, the AND gate remains open, i.e. delivers a 1 at its output, and the switch 45 is closed until the content of the intermediate store 44 has been fully transferred into the integrator 17. The signal E can also be applied via the switch 47 to a pulse length detection stage 41 which only transmits a 1 at its output when the correct pulse length is present. In this case the pulse length detection stage is likewise connected to the AND gate 50. In this embodiment, which is only shown in broken lines in FIG. 4, the length of the pulse is also taken into account in controlling the closing of the switch.

The method of operation of the circuit of FIG. 4 which can be inserted in each of the two circuits 11, 11' disclosed in the aforementioned copending application is as follows:

The auxiliary switch 47 always closes when the time window is opened by the delay stage 28 during the period in which a sound measurement signal is expected so that all the pulses reaching the input of the phase detector 16 within the predetermined interval which defines the time window are also passed to the counter 48. The counter 48 can, in accordance with the invention, be of very simple construction because it only needs to be able to count up to two to accomplish the task underlying the invention. Accordingly a simple counter of this kind is preferably used. The comparator 49 now immediately makes a comparison as to whether the output of the counter 48 is 1 or differs from 1.

The output of the comparator is 1 when the output of the counter 48 is 1. The output of the comparator 49 is in contrast 0 when the output of the counter 48 differs from 1. In this way the output of the comparator 49 is a measure as to whether one and only one pulse has reached the phase detector 16 within the predetermined interval or time period. If the comparator 49 only finds one pulse it delivers a 1 to one input of the AND gate 50.

Since a 1 is likewise delivered to the second input of the AND gate 50 for a predetermined interval via the pulse forming stage 46 on closure of the time window the value at the output of the AND gate is in this case likewise equal to 1 and the switch 45 closes. The content of the intermediate store 44 is now transferred to the integrator 17 during the period which is determined by the pulse forming stage 46. The frequency generator 13 is then regulated in accordance with the output signal of the integrator 17 to a frequency which corresponds to the transit time of the pulses E along the measurement path.

If, in contrast, no pulse is detected within the predetermined interval during which the auxiliary switch 47 is closed, or if more than one pulse occurs, then the value 0 appears at the output of the comparator 49 and at the output of the AND gate 50 and the switch 45 remains open. Accordingly no change of the frequency of the frequency generator 13 occurs within this time period and consequently there is also no change in the transit time signal represented by this frequency.

In corresponding manner a pulse length which deviates from the norm would also block the AND gate 50 via the pulse length detection stage 41. In this case a 0 is present at the output of the AND gate 50 with the result that the main switch 45 remains open. FIG. 5 shows a somewhat modified circuit in which only one phase detector 16, one intermediate store 44 and a single disturbing influence detection stage 47, 48, 49 is used for the two measurement circuits 11, 11' of the aforementioned parent application. For this purpose the output of the intermediate store 44 is connected in parallel to the main switches 45, 45' of the two low pass filters or integrators 17, 17' preferably via an additionally provided amplifier 54. The outputs of the integrators 17, 17' once again control the frequency generators 13, 13' with the setting inputs 15, 15' which are constructed in analogous manner to the frequency generators described in connection with FIGS. 1 to 3.

The two outputs of the frequency generators 13, 13' are now alternately connected to the phase detector 16 (which is framed by a broken line) via a change-over switch 55 which switches at the rhythm of the sound pulses. The intermediate store 44 which is likewise indicated in broken lines is again connected to the output of the phase detector.

The AND gates 50, 50' which are connected in analogous manner to those of FIG. 4 are controlled, in the one case, directly by the main pulse generator 12 and, in the other case, via an inversion stage 56. The purpose of the inversion stage 56 is to ensure that at any one time only one of the AND gates has a 1 at its input, i.e. that at any one time only one of the gates is open for the signal from 49.

The phase detector 16 and the disturbing influence detection stage 47, 48, 49 of the circuit of FIG. 5 have D-flipflops 1, 2, 3 and 8. If the value +1 is present at the D-input of each D-flipflop then it will be transmitted to the output Q1 (white) when a 1 is present at the T-input (clock input) and at the set input. If the value 0 is present at the set input, which is illustrated at the narrow side, then the value 1 appears at the output Q2 (black) and the value 0 at the output Q1 (white).

The opening of the time window or the beginning and end of the predetermined time interval are defined by a 1 at the output of the delay stage 28. From a knowledge of the limiting values for the speed of sound and the various operating conditions which are to be determined it is possible to approximately predict the time interval in which the sound measurement pulses will appear. The position and width of the time window is preselected accordingly. The time window signal from the delay stage 28 is applied to the set inputs of the D-flipflops 1 and 2 and, via an inverter member 4, to the clock input (T-input) of the D-flipflop 8. In this way the D-flipflops 1 and 2 are released within the predetermined interval.

At the end of or, preferably, shortly before the end of the time window the value 1 appears at the output of the pulse forming stage 46 and remains for a period such that the transit time signal stored in the intermediate store 44 can be transferred into the integrators 17, 17'. The pulse E formed from the electroacoustic converters at the ends of the measurement path are applied to the T-inputs of the D-flipflops 2, 3.

The first leading flank of each of the electrical measurement pulses E sets, within the time window, the D-flipflop 2 which, as a result of the connection of its Q1 output to the set input of the D-flipflop 3, terminates the compulsory resetting of the D-flipflop 3. Each further front flank of an incoming electrical measurement pulse will now set the D-flipflop 3 whereby a plurality of pulses entering the phase detector 16 will be registered during the open period of the time window.

The front flanks of the signals coming from the frequency generators 13 and 13' set the D-flipflop 1 after respective comparison intervals given by the reciprocals of the respective generator frequencies (if necessary together with a constant system time) have elapsed since the time of transmission of respective acoustic signals along the measurement path from one transmitter/receiver to the other.

The exclusive OR gate 5 which is connected to the output Q2 of the D-flipflop 1 is also connected to the output Q2 of the D-flipflop 2 so that it determines whether the two D-flipflops are in different states. If the exclusive OR gate 5 has detected a different state then a so-called Tri-State gate 7 is activated. The Tri-State gate 7 is connected to the output Q1 of the D-flipflop 2 and its output feeds the intermediate store 44. When the D-flipflop 2 switches the Tri-State gate 7 transmits a high (or low) level if the front flank of the electrical measuring pulse arrived first. The clear or erase input 52 of the intermediate store 44 controls an erase switch 57 which is connected parallel to the capacitor of the RC network 53. In FIG. 4 the erase input 52 is so controlled by the pulse generator 12 that the switch 57 is closed for a short time before the time window opens in order to discharge the capacitor of the RC network 53.

The Tri-State gate 7, the output of which represents the output of the phase detector 16, delivers a pulse to the RC network 53 of the inermediate store 44 with the length of the pulse being equal to the time difference between the comparison pulse from the frequency generator 15, 15' and the flank of the electrical measurement pulse E from the measuring path. The output signal of the phase detector 16 is for example +5 V when the sound measurement pulse E arrives too early and is 0 V if it arrives too late. At times outside of the pulses the output of the phase detector 16 is not connected with the subsequent circuit and it then has a high ohmic resistance.

As seen in FIG. 5 the capacitor is connected to a reference voltage of 2.5 V and it charges to this voltage in the pauses between the pulses. The capacitor is now charged via the resistance of the RC network 53 on the arrival of a pulse at the output of the phase detector 16. The larger the pulse width at the output of the phase detector the greater is the voltage change which occurs at the capacitor of the RC network 53.

The maximum deviation of the voltage of the capacitor of the RC network 53 relative to the reference voltage of 2.5 V however only amounts to ±2.5 V. Furthermore the time constant of the RC network 53 is, in accordance with the invention, considerably smaller than the duration of opening of the time window. This signifies that received pulses with an unusual temporal position do not have a greater influence on the control circuit than received pulses which arrive within the time corresponding to the time constant. Received pulses with an unusual temporal position are as a rule faulty pulses which are only being treated as useful signals because the correct received signal has failed to arrive. This arrangement prevents faulty pulses which are still effective despite the measures of the invention from exerting too great an influence on the control circuits for the frequency generators.

A more favourable arrangement than merely limiting the maximum control voltage is obtained if the influence of the phase detector on the control circuit for the frequency generators reduces again if large time errors occur. A correspondingly preferred characteristic line for the intermediate amplifier 44 is illustrated in FIG. 6.

The time constant corresponds to the time error which is contributed to by noise, lack of steepness of the flanks of the electrical measurement pulses which are associated with amplitude fluctuations, normal sound disturbances and velocity fluctuations which are faster than should be reproduced at the output of the measurement apparatus. The time window is approximately 4 $\mu$s wide which contrasts with a limit on the temporal position of approximately 3 $\mu$s.

The switch 57 is actuated by an erase pulse when, at the end of each measurement cycle, the information has been transferred via the main switches 45, 45' into the two integrators 17, 17'. The output voltage of the integrators 17, 17' controls the frequencies of the frequency generators 13 and 13' respectively until the output pulse of the frequency generators or of the frequency divider contained therein (see the abovementioned copending application) coincides with the electrical measurement pulse E or E' respectively. As described in the above named copending application the frequency difference of the two frequencies for the two sound directions is proportional to the speed of the flowing medium along the measurement path.

The AND gate 6 which is connected to the output Q2 of the D-flipflop 3 and to the output Q1 of the D-flipflop 2 has the value 1 at its output when one and only one electrical measurement pulse has arrived since the start of the predetermined time interval or period i.e. since the opening of the time window. This 1 is fed at the end of the predetermined interval i.e. on the closing of the time window via the inversion stage 4 into the D-flipflop 8, which was relieved from the need to reset by the connection of its set input to the pulse former stage 46 shortly before the closing of the time window. Accordingly the value 1 is now present at the output of the D-flipflop 8 and is applied to the one input of the AND gate 50 or 50' respectively. The other inputs of the AND gates 50, 50' are connected, as previously mentioned, to the pulse generator 12 in such a way that the AND gates are alternately controlled in dependence on the direction of transmission of the sound pulses. Provided one and only one electrical measurement pulse has been detected during the predetermined interval a 1 is present at both inputs of the respective one of the AND gates 50, 50' which results in the closure of the associated one of the switches 45, 45' and the value stored in the intermediate store 44 is transferred to the associated one of the integrators 17 and 17' via the amplifier 54. The circuit of FIG. 5 thus makes it possible to use the disturbing influence detection stage 47, 48, 49; the phase detector 16, the intermediate store 44 and also the amplifier 54 for the sound measurement pulses E which are obtained in both sound directions by selectively closing only one of the switches 45 or 45'. The two switches 45, 45' can thus never be simultaneously closed. In the normal case they open and close alternately. In the event that a disturbance is detected (no pulse, several pulses and/or abnormal pulse length) both switches 45 and 45' are however jointly open for a period as one of the switches is open within the course of its normal opening cycle and the other switch is open as a result of the disturbance that has been detected.

Modifications to the above described arrangements will be apparent to those skilled in the art. It is for example contemplated that only a single controllable frequency generator could be used in place of the first and second frequency generators of the above described embodiments. In an arrangement of this kind the single frequency generator would have first and second operating modes associated one with each of the first and second transmitter/receivers.

By using suitable switching techniques the single frequency generator would switch in its first mode to a frequency corresponding to the transit time of the acoustic signal in the first direction and, in its second mode, to a frequency corresponding to the transit time of the acoustic signal in the second direction.

In addition it will be appreciated that the first and second transmitter/receivers do not necessarily have to take the form of units in which the same converter acts as both transmitter and receiver. Although this is the preferred arrangement it is also possible to use separate transmitter and receiver units at each end of the measurement path. These units should however lie fairly close together to avoid introducing undesirable inaccuracies into the measurement.

The appended patent claims will be understood to cover also arrangement of the latter kind.

I claim:

1. Apparatus for measuring the speed of flow of a flowable medium by determining the transit time of sound waves therein wherein first and second sound transmitter/receivers in the form of electroacoustic converters are spaced apart in the medium with an imaginary line joining said first and second transmitter/receivers having a component in the direction of the flow to be measured, and wherein sound pulses of predetermined length are alternately transmitted in a first direction from said first transmitter/receiver to said second transmitter/receiver and in a second direction opposite to said first direction from said sound/transmitter/receiver to said first transmitter/receiver, said sound pulses being converted into electrical measuring pulses on arrival at said transmitter/receivers, there being processing circuitry for processing electrical measurement pulses to determine the speed of flow from the transit times of the sound pulses in said first and second directions, said processing circuitry comprising controllable frequency generator means for generating first and second frequencies related to said transit times, and operating to process only electrical measurement pulses arriving within a predetermined interval defining the expected time of arrival of a measuring pulse, and having prevention means for excluding measurement pulses, or signals derived therefrom, from further processing if at least one of the following conditions applies:

(a) more than one electrical measurement pulse arrives in said predetermined interval,
    (b) no measurement pulse arrives in said predetermined interval,
    (c) the electrical measurement pulse exceeds a predetermined length,
    (d) the electrical measurement pulse falls short of a predetermined length,
    wherein said prevention means comprises intermediate store means connected to said controllable frequency generator means for temporarily storing control signals, main switch means disposed between said intermediate store means and said controllable frequency generator means, and means for closing said switch means after the expiry of said predetermined interval, in order to pass control signals stored in said intermediate store means to said controllable frequency generator means, but for keeping said switch means open if at least one of the conditions (a) to (d) applies.

2. Apparatus for measuring the speed of flow of a flowable medium by determining the transit time of sound waves therein wherein first and second sound transmitter/receivers in the form of electroacoustic converters are spaced apart in the medium with an imaginary line joining said first and second transmitter/receivers having a component in the direction of the flow to be measured, and wherein sound pulses of predetermined length are alternately transmitted in a first direction from said first transmitter/receiver to said second transmitter/receiver and in a second direction opposite to said first direction from said second transmitter/receiver to said first transmitter/receiver, said sound pulses being converted into electrical measurement pulses on arrival at said transmitter/receivers, there being processing circuitry for processing electrical measurment pulses to determine the speed of flow from the transit times of the sound pulses in the two directions, said processing circuitry including first and second controllable frequency generators respectively associated one with each of said first and second transmitter/receivers for generating respective oscillating signals, the periods of which are respectively related to the transit times in said first and second directions, circuit means for generating control signals for controlling said first and second frequency generators in dependence on information derived from electrical measurement pulses received within a predetermined interval defining the expected time of arrival of a measuring pulse, and prevention means for preventing control signals generated in respect of said predetermined interval being used to control said frequency generators if at least one of the following conditions applies:

(a) more than one electrical measurement pulse arrives in said predetermined interval,
    (b) no measurement pulse arrives in said predetermined interval,
    (c) a received electrical measurement pulse exceeds a predetermined length,
    (d) a received electrical measurement pulse falls short of a predetermined length,
    wherein said prevention means comprises intermediate store means connected to said controllable frequency generators for temporarily storing said control signals, main switch means disposed between said intermediate store means and said first and second controllable frequency generators, and a control circuit for closing said main switch means after the expiry of said predetermined interval in order to pass control signals stored in said intermediate store means to one of said first and second frequency generators but for keeping said main switch means open if at least one of the conditions (a) to (d) applies.

3. Apparatus in accordance with claim 2 wherein said prevention means further comprises a counter, a signal path for passing said electrical measurement pulse to said counter, an auxiliary switch in said signal path, means for closing said auxiliary switch only during said predetermined interval, a comparator connected to said counter for distinguishing the count (1) from all other counts and wherein said comparator has an output connected to said control circuit, and wherein said control circuit is activated for a short period of time to transmit a "close path signal" to said main switch means following the expiry of said predetermined interval when said comparator has detected one and only one pulse.

4. Apparatus in accordance with claim 3 wherein said prevention means further comprises a pulse length detection stage connected to said control circuit via said auxiliary switch, with said pulse length detection stage only activating said control circuit to transmit a "close path signal " when the pulse length lies with a predetermined tolerance.

5. Apparatus in accordance with claim 4 wherein said prevention means further comprises a pulse former and wherein said control circuit is an AND gate which is connected to the output of said comparator and to said pulse former which transmits a pulse which begins shortly before said predetermined interval and which lasts for a sufficient length of time that the content of said intermediate store means can be completely passed onto one of said controllable frequency generators.

6. Apparatus in accordance with claim 3 and further comprising pulse generating means for activating said electroacoustic converters to produce said sound pulses and a delay device connected between said pulse generating means and said auxiliary switch, said delay device forming said means for closing said auxiliary switch only during said predetermined interval.

7. Apparatus in accordance with claim 3 wherein said circuit means comprises phase detector means and low pass filter means or integrator means associated with said first and second controllable frequency generators and wherein said intermediate store means and said main switch are inserted between said phase detector means and said low pass filter means or said integrator means.

8. Apparatus in accordance with claim 7 wherein said phase detector means has a measurement input and said auxiliary switch is connected to said measurement input.

9. Apparatus in accordance with claim 2 and wherein said intermediate store means has a time constant such that it operates substantially linearly for normal velocity fluctuations but has a characteristic which rises less rapidly or reduces for long time differences.

10. Apparatus in accordance with claim 9 and wherein said intermediate store means comprises an RC network.

11. Apparatus in accordance with claim 9 and wherein said intermediate store means has an erase input which is actuated before the earliest possible arrival of a control signal.

12. Apparatus in accordance with claim 2 wherein a respective processing circuit is provided for each of said first and second directions, each said processing circuit including a respectively associated intermediate store and a main switch.

13. Apparatus in accordance with claim 2 wherein said intermediate store means is used for the evaluation of the transit times in both of said first and second directions.

14. Apparatus in accordance with claim 2 and further including means for erasing the content of said intermediate store means before each successive predetermined interval.

15. Apparatus in accordance with claim 2 wherein the pulse repetition frequency of said sound pulses is constant.

16. Apparatus for measuring the speed of flow of a flowable medium by determining the transit time of sound waves therein wherein first and second sound transmitter/receivers in the form of electroacoustic converters are spaced apart in the medium with an imaginary line joining said first and second transmitter/receivers having a component in the direction of the flow to be measured and wherein sound pulses of predetermined length are alternately transmitted in a first direction from said first transmitter/receiver to said second transmitter/receiver and in a second direction opposite to said first direction from said second transmitter/receiver to said first transmitter/receiver said sound pulses being converted into electrical measurement pulses on arrival at said transmitter/receivers, there being processing circuitry for processing said electrical measurement pulses to determine the speed of flow from the transit times of the sound pulses in the two directions, said processing circuitry including controllable frequency generating means having first and second operating modes respectively associated one with each of said first and second transmitter/receivers for generating respective oscillating signals the periods of which are respectively related to the transit times in said first and second directions, circuit means for generating control signals for controlling said frequency generating means in each of said first and second modes in dependence on information derived from electrical measurement pulses received within a predetermined interval defining the expected time of arrival of a measuring pulse and means for preventing control signals generated in respect of said predetermined interval being used to control said frequency generating means if at least one of the following conditions applies:

(a) more than one electrical measurement pulse is received in said predetermined interval, (b) no electrical measurement pulse is received in said predetermined interval, (c) a received electrical measurement pulse exceeds a predetermined length, (d) a received electrical measurement pulse falls short of a predetermined length.

* * * * *